United States Patent Office 3,068,142
Patented Dec. 11, 1962

3,068,142
SOLVENT SYSTEM COMPRISING DIMETHYL FORMAMIDE - DIMETHYL SULFOXIDE FOR CHLORINATED INSECTICIDES AND MERCURIAL FUNGICIDES
Morton E. Bader, Baltimore, Md., and Alexander J. Budd, Newark, Del., assignors to Olin Mathieson Chemical Corporation, a corporation of Virginia
No Drawing. Filed Aug. 6, 1957, Ser. No. 676,476
9 Claims. (Cl. 167—22)

This invention relates to a novel solvent combination for the purpose of formulating seed protectant compositions which contain insecticides and mercurial fungicides.

Seed protectants are applied to seeds, prior to planting, to protect them from fungus and insect attack for the period between planting and germination. Commonly used insecticides for this purpose are lindane, aldrin, dieldrin and heptachlor. The organic mercurials, such as phenyl mercuric ammonium acetate and methoxyethyl mercuric acetate, are among the most effective fungicides for this use. The pesticides can be applied to the seeds as a dust by tumbling them in a suitable apparatus, or they can be applied by dipping the seeds into a solution of the insecticide and/or fungicide.

The chemistry of the insecticides and mercurial fungicides is such that there are very few solvents which will maintain them both in solution, especially at low temperatures. Thus mercurial fungicides have been applied as aqueous solutions while aliphatic or aromatic hydrocarbons have served as solvents for many of the insecticides used in seed protection. Solvents which have been used to dissolve both an organic insecticide and a mercurial fungicide have generally been expensive and such single compositions could not heretofore compete with the separately applied insecticide and fungicide compositions.

It is an object of this invention to provide an economical solvent composition which will dissolve both an organic insecticide and an organic mercurial fungicide by means of which a uniform coating of both types of pesticides can be applied to seeds in a single application, to provide protection to seeds and seedlings. An additional object of this invention is to provide a solvent which will maintain the pesticides in solution while being stored at low temperatures.

In accordance with these objectives it has been discovered that dimethyl formamide is an excellent solvent for organic chlorine-containing insecticides such as lindane (gamma-benzenehexachloride), aldrin (1,2,3,4,10,10 - hexachloro-1,4,4a,5,8a-hexhydro-1:4,5:8-dimethanonaphthalene), dieldrin (1,2,3,4,10,10 - hexachloro-6,7-epoxy - 1,4,4a,5,6,7,8,8a - octahydro-1:4,5:8-dimethanonaphthalene, heptachlor (1,4,5,6,7,8,8-heptachloro-3a,4,7,7a-terahydro-4:7-endomethanoindene), DDT, methoxychlor, TDE (1,1-dichloro-2,2-bis(p-chlorophenyl)ethane, Dilan, bis(p-chlorophenoxy)methane, chlordane, toxaphene and the like. Dimethyl formamide will also dissolve substantial quantities of organo mercurial fungicides such as methoxyethyl-mercuric acetate, ethyl mercuric chloride, ethyl mercuric iodide, ethyl mercuric phosphate and phenyl mercuric salts such as $(C_6H_5Hg)_2HBO_3$, $C_6H_5HgCl$, $C_6H_5HgOH$, phenyl mercuric acetate, phenyl mercuric benzoate, phenyl mercuric phthalate, phenyl mercuric salicylate, phenyl mercuric gluconate and phenylmercuric ammonium acetate.

The addition of mercurials, however, represses the solubility of certain insecticides in dimethyl formamide. It has further been discovered that the addition of dimethyl sulfoxide to dimethyl formamide produces a solvent pair which can simultaneously dissolve increased quantities of both types of pesticides, and maintain them in solution at the low temperatures encountered in northern United States during winter. The composition so prepared can be sprayed on the seeds, or the seeds can be dipped in the solution and allowed to drain dry. A further advantage lies in the economy of the solvent pair since the cost of dimethyl formamide, at the time of filing this application, is substantially greater than that of dimethyl sulfoxide.

The compositions of this invention are mixtures of an organic insecticide, an organic mercurial fungicide and dimethyl formamide. Dimethyl sulfoxide can additionally be incorporated as a solubilizing agent of enhanced activity for certain insecticides which are only slightly soluble in the presence of the mercurials. The mercurials can be incorporated into the compositions in anhydrous form, or in the form of an aqueous slurry or solution. When a slurry or solution is used, however, the final composition will generally not contain more than ten percent by weight of water, based upon the weight of the solvent base, that is, the weight of the dimethyl formamide plus dimethyl sulfoxide, if any. The solvent base for the pesticides comprises 60 percent to 85 percent by weight of dimethylformamide and 15 percent to 40 percent by weight of dimethyl sulfoxide. The most advantageous concentrations of the pesticides will depend upon the nature of the particular type of seed to which the composition is applied and the storage conditions. An insecticide content of about 15 percent to 50 percent by weight based on the weight of the solvent mixture, and a mercurial fungicide content of about 0.25 percent to 10 percent by weight based on the weight of the solvent mixture will satisfy general requirements for seed treatment when applied at about 3–4 ounces per bushel of seeds. Those skilled in the art can readily determine the most advantageous concentrations and types of pesticides best adapted to provide protection to seeds under various conditions. After the seeds are treated with the pesticidal composition they can be planted while moist or held under normal storage conditions.

The following examples illustrate the effectiveness and absence of phytotoxicity of the solvent blend.

*Example I*

The following table illustrates the extent of solubility of two representative insecticides at —25° C. in dimethyl formamide (DMF) in combination with dimethyl sulfoxide (DMS) when aqueous mercurial fungicides are present. The numbers indicate grams.

|  | DMF/DMS 85/15 | | DMF/DMS 70/30 | |
| --- | --- | --- | --- | --- |
|  | m | p | m | p |
| Lindane | 18 | 17 | 27 | 24 |
| Dieldrin | 12 | 8 | 18 | 15 |

The subheading *m* indicates the presence in the solvent mixture of 6 grams of a 7 percent by weight aqueous solution of methoxyethyl mercuric acetate. The subheading *p* indicates the presence, in the solvent mixture, of 6 grams of a 7 percent by weight aqueous solution of phenyl mercuric ammonium acetate. The replacement of part of the dimethyl formamide with dimethyl sulfoxide increases the solubility of the insecticides, making it possible to prepare more concentrated mixtures.

*Example II*

The phytotoxicity of a mixture comprising two parts by weight of dimethyl formamide (DMF) and one part by weight of dimethyl sulfoxide (DMS) was determined on two representative seed types, wheat and peas, by placing seeds of each type into a jar containing the solvents. The jars were rotated for about 15 minutes until the liquid was uniformly adsorbed on the seeds. The moist seeds were then planted in flats of autoclaved sandy loam. A control treatment was also run by treating seed with water according to the above procedure. The emergence of plants after nine days is recorded in the following table:

|  | Wheat | | Peas | |
| --- | --- | --- | --- | --- |
|  | Percent Emergence | Mean height, inches | Percent Emergence | Mean height, inches |
| DMF/DMS=2/1 | 98 | 3.80 | 96 | 2.0 |
| Water | 80 | 3.25 | 88 | 2.0 |

Although the final composition of this invention can be diluted with water before application, the above table shows that this is not necessary since the anhydrous solvent blend is generally nonphytotoxic.

*Examples III to VII*

The following compositions are further examples of this invention. The numbers indicate grams and the compositions are prepared by simply mixing the required amounts of the various ingredients at room temperature.

|  | DMS | DMF | Dieldrin | Heptachlor | Phenyl mercuric acetate | Methoxy-ethyl mercuric acetate |
| --- | --- | --- | --- | --- | --- | --- |
| Example III | 24.7 | 50.0 | 20.0 |  |  | 1.6 (as 30 weight per cent aqueous solution). |
| Example IV | 23.4 | 47.2 | 27.1 |  |  | 2.3 |
| Example V | 23.2 | 47.4 |  | 27.1 |  | 2.3 |
| Example VI | 24.7 | 50.0 | 20.0 |  |  | 5.3 |
| Example VII | 20.7 | 42.0 |  | 29.4 |  | 7.9 |

*Example X*

The formulations described in Examples IV, V, VI and VII were tested for phytotoxicity by determinations of emergence of treated seed 9 days after planting. The dosage for the wheat was 4 oz. per bushel. The dosage for the peas was 4 oz. per 100 pounds. Water was used as the control. The formulations were added to seeds in a jar which rotated for 15 minutes to secure uniform seed coatings. The seeds were planted immediately while slightly wet from each treatment in plots of autoclaved 1:1 sand:loam. The rows were about 2 inches apart and randomized. Emergence records consisted of the number of plants emerged and their approximate height as follows:

| Formulation | Wheat | | Peas | |
| --- | --- | --- | --- | --- |
|  | Percent emergence | Mean height, inches | Percent emergence | Mean height, inches |
| Example IV | 94 | 2.90 | 94 | 2 |
| Example V | 66 | 2.70 | 92 | 2 |
| Example VI | 80 | 3.50 | 98 | 2 |
| Example VII | 92 | 2.75 | 90 | 2 |
| Water | 80 | 3.25 | 88 | 2 |

The results show the formulations to be nonphytotoxic.

What is claimed is:

1. A composition of matter suitable for use in the treatment of seeds, the said composition consisting essentially of a solution of an organic chlorine-containing insecticide and an organic mercury-containing fungicide both dissolved in a solvent base consisting essentially of from 60 to 85 percent by weight of dimethyl formamide and from 40 to 15 percent by weight of dimethyl sulfoxide, said composition containing from 15 to 50 percent by weight of said insecticide, based upon the weight of said solvent base, and from 0.25 to 10 percent by weight of said fungicide, based upon the weight of said solvent base.

2. The composition of claim 1 wherein said organic chlorine-containing insecticide is lindane and wherein said organic mercury-containing fungicide is phenyl mercuric ammonium acetate.

3. The composition of claim 1 wherein said organic chlorine-containing insecticide is dieldrin.

4. The composition of claim 1 wherein said organic mercury-containing fungicide is phenyl mercuric ammonium acetate.

5. The composition of claim 1 wherein said organic mercury-containing fungicide is methoxy ethyl mercuric acetate.

6. The composition of claim 1 wherein said organic chlorine-containing insecticide is lindane and wherein said organic mercury-containing fungicide is methoxy ethyl mercuric acetate.

7. The composition of claim 1 wherein said organic chlorine-containing insecticide is dieldrin and wherein said organic mercury-containing fungicide is methoxy ethyl mercuric acetate.

8. The composition of claim 1 wherein said organic chlorine-containing insecticide is dieldrin and wherein said organic mercury-containing fungicide is phenyl mercuric ammonium acetate.

9. The composition of claim 1 wherein said organic chlorine-containing insecticide is heptachlor.

References Cited in the file of this patent

UNITED STATES PATENTS

| 2,309,289 | Zade | Jan. 26, 1943 |
| 2,619,446 | Andersen | Nov. 25, 1952 |

FOREIGN PATENTS

| 290,364 | Great Britain | May 14, 1928 |
| 586,691 | Great Britain | Mar. 27, 1947 |
| 606,578 | Great Britain | Aug. 17, 1948 |

OTHER REFERENCES

United States Department of Agriculture, A Review of DDT Formulations, Bulletin E-742, page 6, February 1948.

Scheflan et al.: Handbook of Solvents, pp. 310, 407-8 and 550, 1953.

Shell Chemical Corp., Handbook of Aldrin, Dieldrin and Endrin Formulations, page 6, December 1954.